United States Patent
Matsushima

(10) Patent No.: US 7,693,416 B2
(45) Date of Patent: Apr. 6, 2010

(54) IMAGE CAPTURING APPARATUS AND FOREIGN SUBSTANCE REMOVING METHOD THEREOF

(75) Inventor: Hiroshi Matsushima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 11/735,717

(22) Filed: Apr. 16, 2007

(65) Prior Publication Data

US 2007/0242947 A1 Oct. 18, 2007

(30) Foreign Application Priority Data

Apr. 17, 2006 (JP) .............................. 2006-113745

(51) Int. Cl.
*G03B 17/00* (2006.01)
*G03B 19/00* (2006.01)

(52) U.S. Cl. ........................................ 396/429; 396/55

(58) Field of Classification Search .................. 396/429
See application file for complete search history.

(56) References Cited

U.S. PATENT DOCUMENTS

2004/0047625 A1* 3/2004 Ito et al. ...................... 396/429
2005/0104997 A1* 5/2005 Nonaka ....................... 348/360

FOREIGN PATENT DOCUMENTS

JP 2003-319222 11/2003

* cited by examiner

*Primary Examiner*—Rodney E Fuller
(74) *Attorney, Agent, or Firm*—Cowan, Liebowitz & Latman, P.C.

(57) ABSTRACT

In a case that a cleaning mode is designated, it is determined whether or not a lens unit is attached to a camera main body. If it is determined that the lens unit is not attached to the camera main body, a quick return mirror is moved upward and a shutter is opened, and a photoelectric conversion device, or a cover glass or an optical filter of the photoelectric conversion device is vibrated, thereby foreign substances attached to the photoelectric conversion device and the like are removed.

13 Claims, 3 Drawing Sheets

IMAGE CAPTURING APPARATUS AND FOREIGN SUBSTANCE REMOVING METHOD THEREOF

BACKGROUND OF THE INVENTION

1. Field of the Invention

The present invention relates to an image capturing apparatus which drops foreign substances by vibration from an image sensor or a low pass filter, a cover glass and the like on the image sensor, thereby removing the foreign substances, and a foreign substance removing method in the image capturing apparatus.

2. Description of the Related Art

In a digital camera which no longer uses films, in a case where foreign substances (dust) are attached to an image sensor or a low pass filter, a cover glass and the like on the image sensor, the shadows of the foreign substances always come out in photographed images obtained thereafter. In the digital camera, since a mechanical operation such as film feed by each image capture is not performed, the attached foreign substances stay in the same position.

Various methods to remove such foreign substances have been proposed. As one of the methods, Japanese Patent Application Laid-Open No. 2003-319222 discloses causing an element such as a low pass filter or a cover glass to vibrate and letting foreign substances attached to the elements drop.

However, in the conventional technique, upon removal of foreign substances by vibration, the filter, the cover glass or the like is vibrated while a quick return mirror is in a down state and a shutter is closed. The foreign substances dropped by the vibration cannot get out of the camera main body. To collect the dropped foreign substances, a double-faced tape or the like may be provided around a position between e.g. the shutter and the filter or the cover glass. The foreign substances are attached to the tape, thereby fly-off of the foreign substances can be prevented. The double-faced tape can be exchanged at a service center but it cannot be exchanged by a user herself/himself. Accordingly, in a case where the adhesivity of the tape is lowered, foreign substances cannot be caught with the tape and may fly within the camera.

SUMMARY OF THE INVENTION

The present invention has been made so as to address the above-described problem in the conventional art.

The present invention provides a technique of, upon designation of cleaning mode in a case that a lens unit is not attached, performing foreign substance removing operation in a state where a quick return mirror is up (mirror lockup) and a shutter is open, thereby discharging foreign substances, dropped by vibration, to the outside of an image capturing apparatus main body.

According to an aspect of the present invention, there is provided an image capturing apparatus for obtaining photographed image with a photoelectric conversion device, comprising:

a determination unit configured to determine whether or not a lens unit is attached to the image capturing apparatus;

a vibration unit configured to vibrate the photoelectric conversion device, or a cover glass or an optical filter of the photoelectric conversion device;

a designation unit configured to designate a cleaning mode;

a first control unit configured to, in a case that the cleaning mode is designated by the designation unit and the determination unit determines that the lens unit is attached, move downward a quick return mirror and close a shutter, and drive the vibration unit; and a second control unit configured to, in a case that the cleaning mode is designated by the designation unit and the determination unit determines that the lens unit is not attached, move upward the quick return mirror and open the shutter, and drive the vibration unit.

Further, according to an aspect of the present invention, there is provided a foreign substance removing method in an image capturing apparatus which obtains a photographed image with a photoelectric conversion device, comprising:

a determination step of determining whether or not a lens unit is attached to the image capturing apparatus;

a vibration step of vibrating the photoelectric conversion device, or a cover glass or an optical filter of the photoelectric conversion device;

a designation step of designating a cleaning mode;

a first control step of, in a case that the cleaning mode is designated in the designation step and it is determined in the determination step that the lens unit is attached, moving downward a quick return mirror and closing a shutter, and driving the vibration unit; and a second control step of, in a case that the cleaning mode is designated in the designation step and it is determined in the determination step that the lens unit is not attached, moving upward the quick return mirror and opening the shutter, and driving the vibration unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An embodiment of the present invention will now be described in detail with reference to the accompanying drawings. It should be noted that the embodiment below does not limit the present invention set forth in the claims and that not all of the combinations of features described in the embodiment are necessarily essential as means for attaining the objects of the invention.

In the present embodiment, a camera which drops foreign substances attached to a filter, a CCD cover glass and the like by vibration will be described. A lens unit is removably attached to the camera. In a case that the lens unit is attached to the camera, the filter or the cover glass is vibrated with a quick return mirror in a down state and a focal plane shutter in a closed state. On the other hand, in a case that the lens unit is not attached to the camera, the filter or the cover glass is vibrated with the quick return mirror in an up state and the focal plane shutter in a full-open state.

Figure 1:
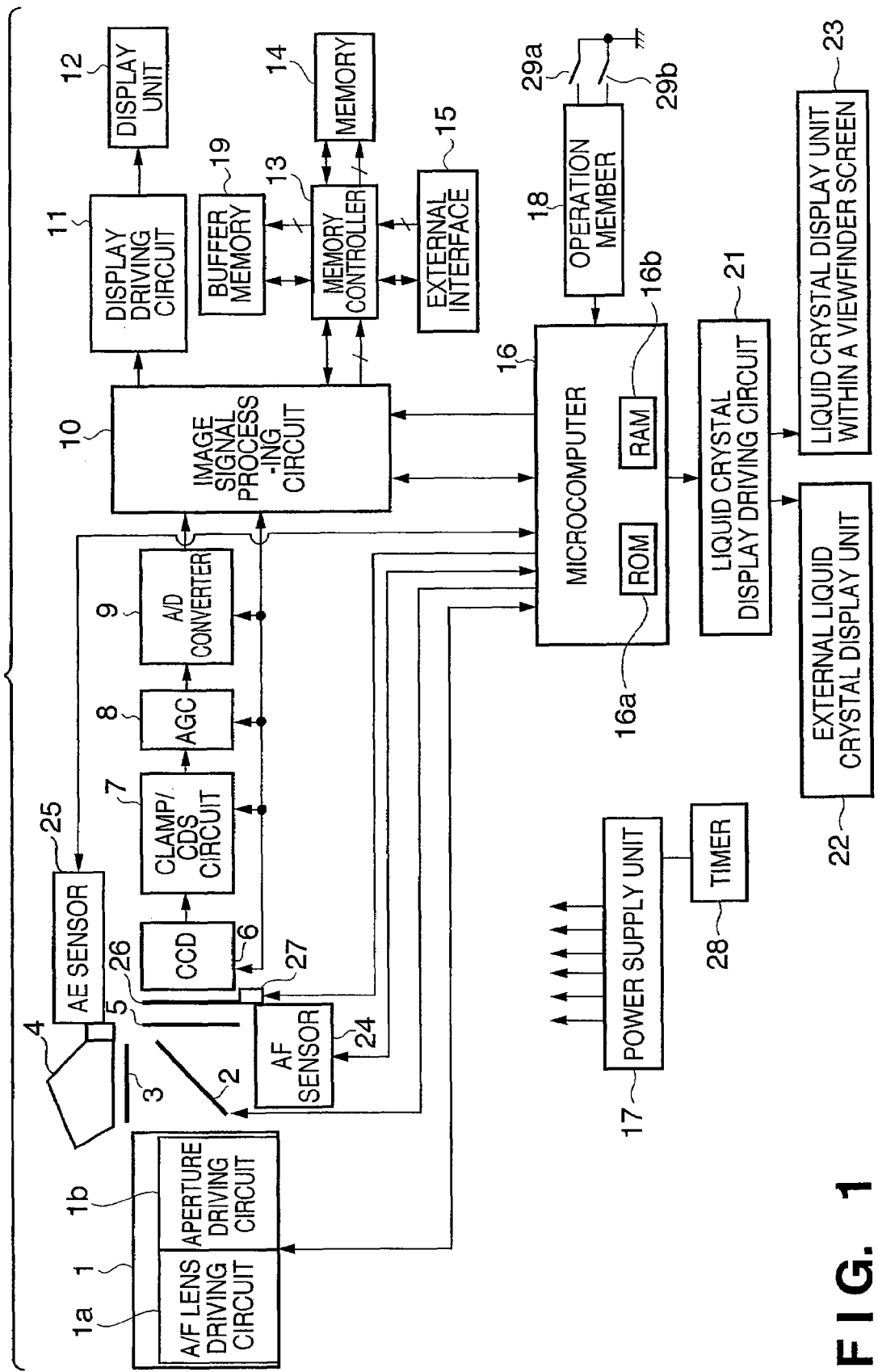
FIG. 1 is a block diagram showing a configuration of a camera according to an embodiment of the present invention.

FIG. 1 is a block diagram showing a configuration of the camera (image capturing apparatus) according to the embodiment of the present invention.

Reference numeral 1 denotes an exchangeable lens unit. As the lens unit 1, a zoom lens may be employed. The lens unit 1 has driving circuits 1a and 1b for autofocus (AF) control and aperture control. The AF lens driving circuit 1a having e.g. a stepping motor focuses the camera by changing a focus lens position of the lens unit 1 in accordance with the control of a microcomputer 16 based on an output from an AF sensor 24. The aperture driving circuit 1b changes an optical aperture value in accordance with the control of the microcomputer 16. The microcomputer 16 communicates with the lens unit 1 and can obtain information on a current zoom position (focal length data) and a current distance to an object. Further, the microcomputer 16 determines whether or not the lens unit 1 is attached to the camera based on whether or not the communication can be performed with the lens unit 1.

Numeral 2 denotes a quick return mirror which moves upward/downward by driving of an actuator (not shown) in accordance with an instruction from the microcomputer 16. The quick return mirror 2 is a half mirror so as to guide light to an AF optical system. A sub mirror is moved in accordance with the movement of the quick return mirror 2. Numeral 3 denotes a focusing screen. A user can check the focusing state and the picture composition of an image obtained through the lens unit 1 by observing an image displayed on the focusing screen 3 through a pentaprism 4 and a finder optical system. Numeral 5 denotes a focal plane shutter used for the control of exposure time period on a CCD 6 by the control of the microcomputer 16. The focal plane shutter 5 generally has a front curtain and a rear curtain, and the exposure time period is controlled by opening/closing of these curtains.

The CCD 6 is employed as an image sensor. The CCD 6 performs photoelectric conversion on an image formed through the lens unit 1 into an electric signal. A clamp/CDS circuit 7 and an AGC (Auto Gain Controller) 8 perform basic analog processing on the electric signal. Note that the clamp level and AGC reference level can be changed by the microcomputer 16. An A/D converter 9 inputs the processed electric signal and converts the signal into a digital signal. At this time, the A/D converter 9 performs conversion in correspondence with a set ISO film speed.

An image signal processing circuit 10 inputs the image data digitized by the A/D converter 9, then performs filtering processing, color conversion processing, gamma conversion processing and the like on the data, and outputs the image data to a memory controller 13 to store the image data into a memory 14. Further, as the image signal processing circuit 10 includes a D/A converter, a digital image signal converted by the A/D converter 9 or image data read from the memory 14 via the memory controller 13 can be converted into an analog signal and outputted to a display unit (monitor) 12 through a display driving circuit 11. The selection of the image data read from the memory 14 or D/A converted image data is made based on data exchange between the image signal processing circuit 10 and the microcomputer 16. Further, the image signal processing circuit 10 can output white balance information to the microcomputer 16. The microcomputer 16 performs the white balance control based on the information. Note that image data can be stored into a buffer memory 19 through the memory controller 13 in accordance with an instruction from the microcomputer 16. Further, the image signal processing circuit 10 has a function of compressing image data such as JPEG data. In the case of continuous image capturing, the obtained image data is temporarily stored into the buffer memory 19, then, when processing is not performed, the unprocessed image data is read from the buffer memory 19 through the memory controller 13, subjected to the image processing and/or the compression processing by the image signal processing circuit 10, thereby the speed of continuous image capture is increased. Accordingly, the number of recordable frames in continuous image capture is strongly influenced by the capacity of the buffer memory 19.

Further, the microcomputer 16 obtains the ISO film sensitivity set before image capture, the image size and a predicted data amount in correspondence with image quality. The microcomputer 16 can obtain the number of recordable frames by checking the available capacity of the memory 14 through the memory controller 13 and comparing the capacity with the predicted data amount, and display the obtained number of recordable frames on the display unit 12. The memory controller 13 stores unprocessed digital image data inputted from the image signal processing circuit 10 into the buffer memory 19, and stores processed digital image data into the memory 14. Further, the memory controller 13 reads image data from the buffer memory 19 or the memory 14 and outputs the data to the image signal processing circuit 10. Further, the memory controller 13 stores image data inputted via an external interface 15 into the memory 14 or outputs image data stored in the memory 14 via the external interface 15. The memory 14 may be a fixed internal memory or may be a removable memory.

A power supply unit 17 having a battery supplies necessary power to respective ICs and driving systems. An operation member 18, operated by a user, transmits information to the microcomputer 16 in accordance with the user's operation. The microcomputer 16 controls the respective elements in accordance with the operation at the operation member 18. When only a switch SW 29a of a release button 29 is ON, the release button 29 is in a half stroke state. When both the switches SW 29a and SW 29b are ON, the release button 29 is in a full stroke state, and at this time, image capture is performed. The operation member 18 is further provided with switches such as an ISO setting button, an image size setting button, an image quality setting button, and an information display button, and the states of these switches are detected. A liquid crystal display driving circuit 21 drives an external liquid crystal display unit 22 and a liquid crystal unit within a viewfinder screen 23 in accordance with a display instruction from the microcomputer 16. The liquid crystal unit within viewfinder screen 23 includes a backlight such as an LED (not shown), and the LED is also driven by the liquid crystal display driving circuit 21.

An AF sensor 24 outputs defocus information to the microcomputer 16. The microcomputer 16 performs communication with the lens unit 1 and focuses the camera using the AF lens driving circuit 1a in the lens unit 1 based on the defocus information. An AE sensor 25 performs metering on an image on the focusing screen 3, thereby measures the brightness of a subject through the lens unit 1. Note that the microcomputer 16 has a ROM 16a holding a control program and the like performed by the microcomputer 16, and a RAM 16b used as a work area for storing various data upon operation of the microcomputer 16. A timer 28 measures time during an electric power is supplied by the power supply unit 17. The measured time is used for recording of image capture date and time. Further, the timer 28 performs time measurement in accordance with an instruction from the microcomputer 16, and when the measured time has reached a designated time period, notifies the microcomputer 16 of the time by interruption or the like.

Numeral 26 denotes a low pass filter also having an infrared light cutting function. An airtight structure is formed between the CCD 6 and the low pass filter 26. In the camera having this structure, foreign substances from the outside or foreign substances generated within the camera may be attached to the focal plane shutter 5 side of the low pass filter 26, but they are not attached to the surface of the CCD 6 or the CCD 6 side of the low pass filter 26. Numeral 27 denotes a vibration member which provides vibration to the low pass filter 26 to drop foreign substances attached to the low pass filter 26 in accordance with an instruction from the microcomputer 16.

Figure 2:
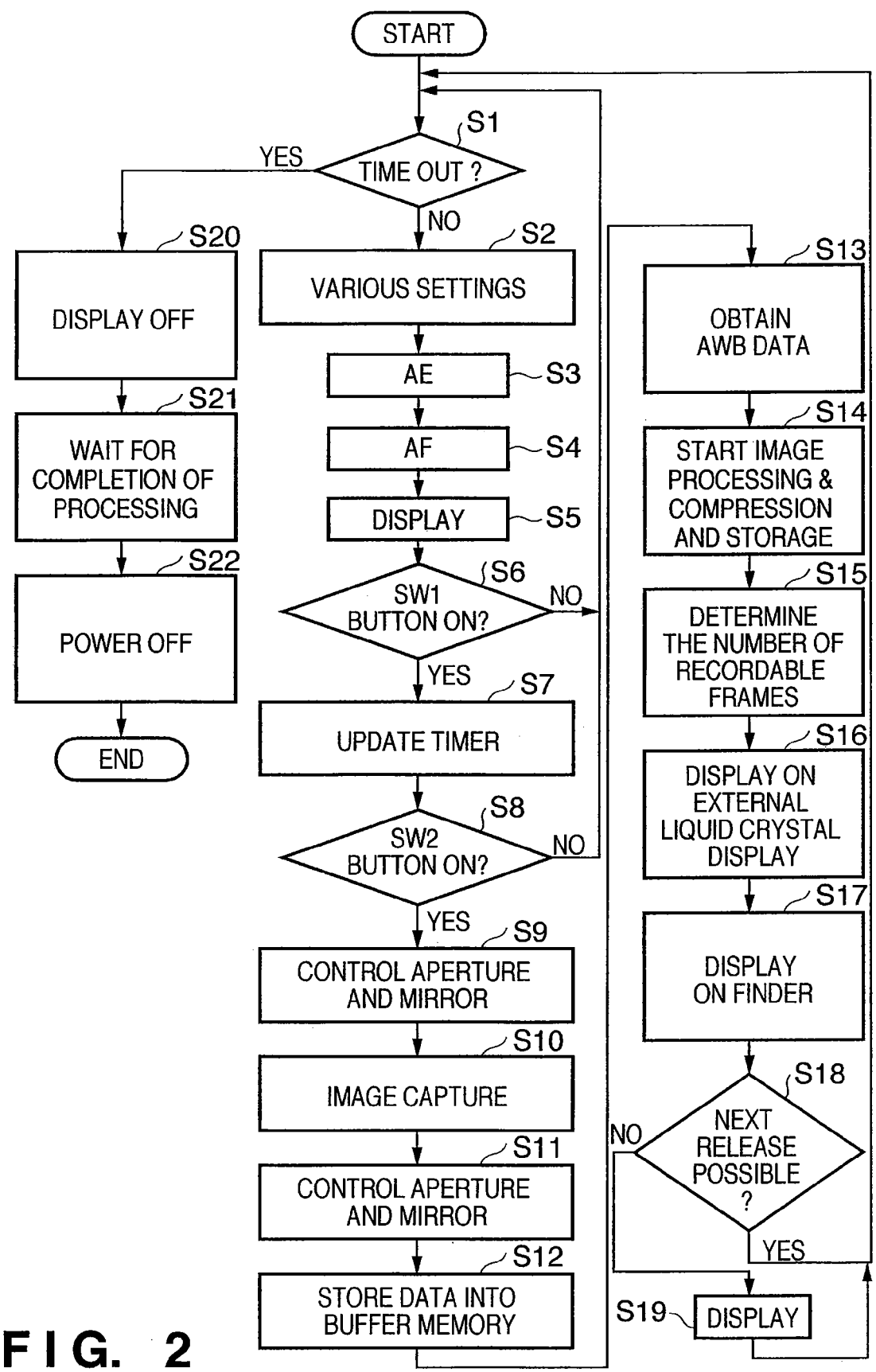
FIG. 2 is a flowchart showing an image capturing operation in the camera according to the embodiment.

FIG. 2 is a flowchart showing an image capturing operation in the camera according the present embodiment. Note that a program for execution of the processing is stored in the ROM 16a, and the processing is performed under the control of the microcomputer 16 in accordance with the program.

This processing is started upon e.g. turning ON of the power source of the camera. First, in step S1, it is determined whether or not a time period of no use of the operation member 18 has reached or passed the predetermined time period (time-out) based on time measurement by the timer 28. If it is determined that time-out has occurred in step S1, the process proceeds to step S20 to turn OFF the power source, otherwise, proceeds to step S2. In step S2, various settings are made in correspondence with the user's operation using the operation member 18. In this embodiment, a camera operation mode, an image capture mode and the like are set in accordance with the user's operation. Note that when the operation member 18 is operated, the time period of the timer 28 for measuring time-out period is reset. Next, the process proceeds to step S3, in which the brightness of a subject is measured based on an output signal from the AE sensor 25, and a shutter speed and an aperture value to obtain appropriate exposure are obtained. Next, in step S4, defocus of the subject is detected based on a signal from the AF sensor 24 and the focusing control is performed. Further, an effective focusing point is determined based on image capture conditions. Actual autofocus control is performed in the second AF processing (S4) next to display processing in step S5. In step S5, the settings in step S2 and various other settings are displayed on the external liquid crystal display 22 or the like. Further, the number of recordable frames is obtained, by comparing a predicted data amount based on predicted image size data corresponding to the ISO film speed, the image size, the image quality set in step S2 with the available capacity of the memory 14 through the memory controller 13, and is displayed on the display unit 12. Further, the focusing state detected in step S4, the shutter speed and the aperture value obtained in step S3 are also displayed on the display unit 12. Further, the effective focusing point determined in step S4 is also displayed on the display unit 12. Then in step S6, it is determined whether or not the release button 29 is in the half stroke. If the release button 29 is half stroked (the switch SW 29a is ON), then the process advances to step S7 to update the settings of the timer 28. On the other hand, the release button 29 is not depressed at all, the process returns to step S1.

In step S7, the time period set in the timer 28 is updated. Then in step S8, it is determined whether or not cable release is possible and the release button 29 is full stroked (the switches 29a and 29b are simultaneously ON). When the release button 29 is full stroked, the process proceeds to step S9, otherwise, the process returns to step S1.

In step S9, the quick return mirror 2 is moved upward, and communication with the lens unit 1 is performed, to control the aperture of the lens 1 to the aperture value obtained in step S3 by the aperture driving circuit 1b. Next, in step S10, the focal plane shutter 5 is controlled so as to control the shutter speed obtained in step S3, and image data supplied by the CCD 6 is processed through the clamp circuit 7, the AGC 8 and the A/D converter 9. Next, in step S11, the quick return mirror 2 is returned to the down state, and communication with the lens unit 1 is performed, to set the lens aperture to an open state. Next, in step S12, a gain value corresponding to the set ISO film sensitivity is sent to the AGC 8 to control sensitivity, and the image data is sent to the memory controller 13 and is temporarily stored into the buffer memory 19. Next, in step S13, an R gain and a B gain used in the image signal processing circuit 10 are determined by computation and controlled based on white balance information outputted from the image signal processing circuit 10. Next, in step S14, in a case that the load on the image signal processing circuit 10 is at an image processing executable level, an operation to process and compress the unprocessed image data stored in the buffer memory 19, and an operation to store the processed image data into the memory 14 are started. Note that in the case of continuous image capture, image data is sequentially continuously stored into the buffer memory 19. In this case, image processing may be stopped. Next, in step S15, the number of recordable frames is calculated based on the image capture mode and the available capacity of the memory 14. Then in step S16, the image data processed in step S14 is outputted to the display driving circuit 11 and is displayed on the display unit 12. Further, the image data is sent to the display driving circuit 11 and is displayed on the display unit 12. Further, in step S17, the image data is similarly displayed on the liquid crystal unit within a viewfinder screen 23.

Next, in step S18, it is determined whether or not image capture for the next frame is possible based on an available area in the memory 14 and the amount of unprocessed image data in the buffer memory 19. If it is determined that the image capture is possible, the process returns to step S1, while it is not determined that the image capture is possible, the process proceeds to step S19, to display an alarm message indicating that image capture is impossible on the display unit 12.

Next, processing in step S1 upon occurrence of time-out measured by the timer 28 will be described. In this case, the process proceeds from step S1 to step S20, at which the display on the display unit 12 is turned OFF by the display driving circuit 11, and the backlight of liquid crystal unit within viewfinder screen 23 is turned OFF. Then in step S21, the process waits for the completion of the image processing and data compression and the storage of image data into the memory 14, started in step S14, and waits until the image data area in the buffer memory 19 becomes available. Upon completion of these processings, the process proceeds to step S22, at which an instruction is outputted to the power supply circuit 17 to stop power supply to the non-used element(s) for power saving. The processing shown with the flowchart of FIG. 2 is basically the same as that in well-known cameras.

Figure 3:
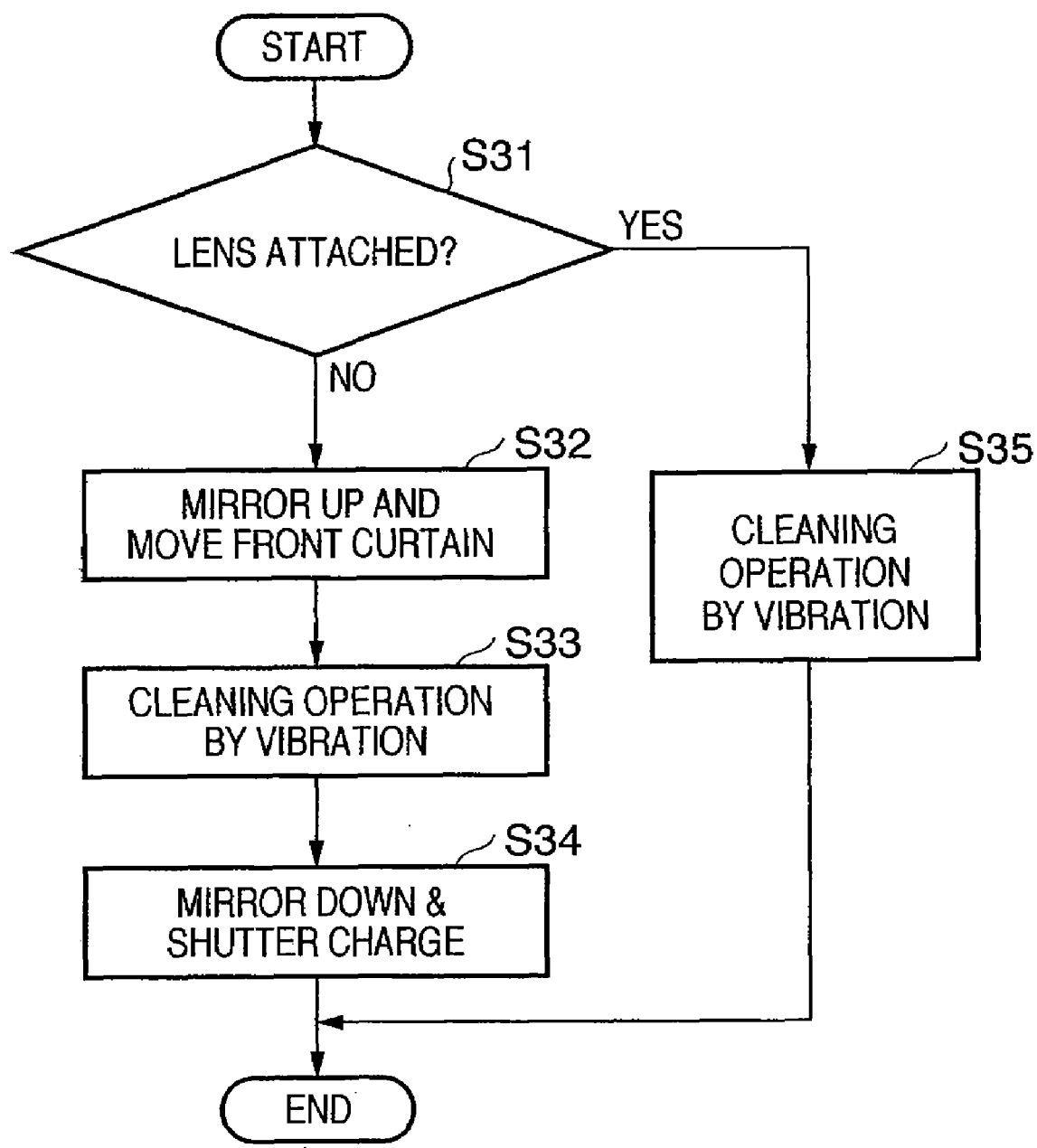
FIG. 3 is a flowchart showing cleaning processing in the camera according to the embodiment.

Next, processing in the camera according to the present embodiment will be described with reference to the flowchart of FIG. 3. This processing is started when the user operates the operation member 18 to instruct to start cleaning processing (foreign substance removal mode) to remove foreign substances by vibrating the vibration member 27 inside the camera. Note that a program for execution of the processing is stored in the ROM 16a, and the processing is performed under the control of the microcomputer 16 in accordance with the program.

In step S31, it is determined whether or not the lens unit 1 is attached to the camera based on determination whether or not communication between the lens unit 1 and the microcomputer 16 is possible. If it is determined that the lens unit 1 is not attached to the camera, the process proceeds to step S32, in which the quick return mirror 2 is moved upward, and the front curtain of the focal plane shutter 5 is moved to an open state while the rear curtain is closed. Next, in step S33, the vibration member 27 is vibrated for a predetermined time period so as to vibrate the low pass filter 26, to drop foreign substances attached to the surface of the low pass filter 26. Note that the time period of the vibration of the vibration member 27 is controlled based on the time period measured by the timer 28. After the vibration member 27 has been vibrated for the predetermined time period, the process proceeds to step S34, in which the quick return mirror 2 is moved downward and the focal plane shutter 5 is closed, and the process ends.

On the other hand, if it is determined in step S31 that the lens unit 1 is attached to the camera, the process proceeds to step S35, in which the rear curtain of the focal plane shutter 5 is moved while the quick return mirror 2 is moved downward and the focal plane shutter 5 is charged. Then, the vibration member 27 is vibrated for the predetermined time period while the focal plane shutter 5 is closed, to perform the foreign substance removal operation. At this time, the vibration of the vibration member 27 is performed as in the case of the above-described step S33. It may be arranged such that an adhesive member such as a double-faced tape is provided inside the camera to fix the foreign substances by attaching the foreign substances dropped by the foreign substance removal operation on the adhesive member. By providing an adhesive member in the camera, dispersal of the foreign substances inside the camera can be prevented.

Next, the advantages of the present embodiment will be described.

In a state where the lens unit 1 is not mounted on a lens mount, in a case that the quick return mirror 2 is up and the focal plane shutter 5 is open, the low pass filter 26 is exposed to the outside. Accordingly, in this state, if the vibration member 27 is vibrated while the camera is faced downward, foreign substances on the low pass filter 26 are flown to the outside. There is a very low probability that the foreign substances return into the camera from the outside.

Further, in a state where a lens cap is attached to the lens mount in spite of the lens unit, the cleaning mode (foreign substance removal mode) can be set by using the operation member 18. At this time, when the camera is faced downward and the cleaning mode is started. In this case, since the lens unit 1 is not attached, the filter and the cover glass are vibrated while the quick return mirror 2 is up and the shutter 5 is fully open. By this operation, foreign substances attached to the filter and the cover glass drop within the lens cap. In a case where a double-faced tape or an adhesive member and the like to catch the foreign substances is provided inside the lens cap, the foreign substances dropped within the lens cap are attached to the adhesive member without dispersing. Further, collection and disposal of foreign substances can be easily performed by removing the adhesive member from the lens cap and discarding it.

Further, if a transparent lens cap is prepared, the removal of foreign substances by an operation similar to that in the above description can be observed.

Further, in a case that the lens unit 1 is attached to the camera, as the quick return mirror 2 is moved downward and the focal plane shutter 5 is closed, there is no probability that fine foreign substances dropped in the cleaning mode enter the lens unit 1. Generally, a gap may exist in the rear part (CCD side) of the exchangeable lens unit 1 due to movement of the lens and movement of air within the lens unit. Accordingly, if foreign substances enter the gap and attached to the surface of the lens inside the lens unit 1, it is almost impossible for the user to remove the foreign substances. That is, in such case, it is necessary to conduct costly overhaul cleaning at a service center or the like to remove the foreign substances. However, in the present embodiment, in a case that the lens unit is attached to the camera, there is a very low probability that foreign substances dropped by vibration arrive at the lens unit 1. Accordingly, the above problem of the occurrence of costly overhaul cleaning can be prevented.

In the above embodiment, the cleaning mode is set in a case that the quick return mirror 2 is in the down state. However, in the case of e.g. EVF operation where the cleaning mode is set while the quick return mirror 2 is in the up state, if the lens unit 1 is attached to the camera, the quick return mirror 2 is moved downward and the focal plane shutter 5 is closed, and then the vibration member 27 is driven. On the other hand, if the lens unit 1 is not attached, the vibration member 27 is driven while the quick return mirror 2 is in the up state and the focal plane shutter 5 is open.

Further, in the above embodiment, the low pass filter 26 is vibrated, however, the vibrated member is not limited to the low pass filter. For example, it may be arranged such that the cover glass covering the image sensor is vibrated, or another optical member is arranged on a photographing optical axis and the optical member is vibrated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-113745, filed Apr. 17, 2006, which is hereby incorporated by reference herein in its entirety.

What is claimed is:

1. An image capturing apparatus for obtaining photographed image with a photoelectric conversion device, comprising:
   a lens mount configured to mount a lens unit or a unit other than the lens unit;
   a determination unit configured to determine whether the lens unit or the unit other than the lens unit is mounted to the lens mount unit;
   a vibration unit configured to vibrate the photoelectric conversion device, or a cover glass of the photoelectric conversion device or an optical filter;
   a designation unit configured to designate a cleaning mode; and
   a control unit configured to, in a case that the cleaning mode is designated by the designation unit and the determination unit determines that the lens unit is mounted, drive the vibration unit in a state in which a shutter is closed,
   wherein, in a case that the cleaning mode is designated by the designation unit and the determination unit determines that the unit other than the lens unit is mounted, the control unit drives the vibration unit in a state in which the shutter is opened.

2. The apparatus according to claim 1, wherein the determination unit determines whether or not the lens unit is mounted based on whether or not communication with the lens unit is possible.

3. The apparatus according to claim 1, further comprising a timer configured to measure time,
   wherein the control unit controls the vibration of the vibration unit in correspondence with a time period measured by the timer.

4. The apparatus according to claim 1, wherein the control unit closed the shutter after a completion of driving the vibration unit in the state in which the shutter is opened.

5. The apparatus according to claim 1, further comprising an adhesive member configured to fix foreign substances removed in the cleaning mode with adhesivity.

6. The apparatus according to claim 1, wherein the control unit moves downward a quick return mirror in a case that the cleaning mode is designated by the designation unit and the determination unit determines that the lens unit is mounted, and the control unit moves upward the quick return mirror in a case that the cleaning mode is designated by the designation unit and the determination unit determines that the lens unit is not mounted.

7. The apparatus according to claim 1, wherein the unit other than the lens unit is a lens cap in which an adhesive member is provided.

8. A foreign substance removing method in an image capturing apparatus which obtains a photographed image with a photoelectric conversion device, comprising:
- a determination step of determining whether a lens unit is mounted to a lens mount or a unit other than the lens unit is mounted to the lens mount;
- a vibration step of vibrating the photoelectric conversion device, or a cover glass of the photoelectric conversion device or an optical filter; and
- a designation step of designating a cleaning mode,
- wherein in a case that the cleaning mode is designated in the designation step and it is determined in the determination step that the lens unit is mounted, executing the vibration step in a state in which a shutter is closed, and
- in a case that the cleaning mode is designated in the designation step and it is determined in the determination step that the unit other than the lens unit is mounted, executing the vibration step in a state in which the shutter is opened.

9. The method according to claim 8, wherein in the determination step, it is determined whether or not the lens unit is mounted to the lens mount based on whether or not communication between the lens unit and the image capturing apparatus is possible.

10. The method according to claim 8, further comprising a time measurement step of measuring time,
- wherein the vibration step is executed in correspondence with a time period measured in the time measurement step.

11. The method according to claim 8, wherein the shutter is closed after a completion of executing the vibration step in the state in which the shutter is opened.

12. The method according to claim 8, wherein, in a case that the cleaning mode is designated in the designation step and it is determined in the determination step that the lens unit is mounted, a quick return mirror is moved downward, and
- in a case that the cleaning mode is designated in the designation step and it is determined in the determination step that the lens unit is not mounted, the quick return mirror is move upward.

13. The method according to claim 6, wherein the unit other than the lens unit is a lens cap in which an adhesive member is provided.

* * * * *